June 26, 1951 G. L. FREDENDALL 2,558,351

COLOR TELEVISION RECEIVER

Filed Dec. 5, 1946 2 Sheets-Sheet 1

INVENTOR

Gordon L. Fredendall

BY

ATTORNEY

June 26, 1951 G. L. FREDENDALL 2,558,351

COLOR TELEVISION RECEIVER

Filed Dec. 5, 1946 2 Sheets-Sheet 2

INVENTOR
Gordon L. Fredendall
BY H. S. Grover
ATTORNEY

Patented June 26, 1951

2,558,351

UNITED STATES PATENT OFFICE 2,558,351

COLOR TELEVISION RECEIVER

Gordon L. Fredendall, Feasterville, Pa., assignor to Radio Corporation of America, a corporation of Delaware Application December 5, 1946, Serial No. 714,267

7 Claims. (Cl. 178—5.4)

My invention relates in general to television receivers and more particularly to television receivers that are used for receiving and reproducing televised images in color.

At the present time there are two outstanding methods and systems for transmitting and reproducing television images in color. The first of these is the so-called sequential type of transmission and in this type of transmission the image to be televised is broken down field by field into its additive component colors and these color fields are scanned in some preselected sequence. This may be accomplished by the use of a single scansion or camera tube with a series of color filters which are moved between the scansion tube and the image being televised in some definite sequence to divide the image into its component color fields, or the image may be utilized to form several individual image representations in color and each of these may be passed through a fixed color filter to a scansion tube whose function is to develop signals representative of one of the component colors. By appropriate commutating means it can be arranged so that each scansion tube will, in some preselected sequence, scan a field of color and the signals representative of each of the color fields is transmitted sequentially. One sequential type of transmission is shown, for instance, in U. S. Patent No. 2,413,075, granted on December 24, 1946, to Otto H. Schade and entitled "Method and System for Developing Television Signals."

A second type of color transmission contemplates that the image being televised is utilized to form several individual images representative thereof, and this is usually done with the aid of partially transparent reflecting members or dichroic mirrors. By using apropriate component color filters interposed between the optical image and a plurality of cameras, all of the color fields so formed may be scanned and signals representative thereof developed simultanteously. The signals so developed are then transmitted simultaneously. One such transmitting system is shown, for instance, in my Patent No. 2,513,159, granted June 27, 1950, and entitled "Color Television Transmitter." The simultaneous type of transmission has some distinct advantages over the sequential type of color television transmission and possibly one of the greatest of these advantages resides in the fact that the signals representative of one of the component colors of the image (and it is usually the green component color) may be utilized by a black and white or monochromatic type of television receiver to reproduce a monochromatic representation of the image being televised.

Another of the advantages of the simultaneous type of color television transmission is that it avoids so-called color "pick-up" or "fringe" effects so often present in the sequential system. If a rapid movement of the eye of the observer is made across the image reproducing screen, he may get the effect of seeing the image in such a manner that it appears to him that the image has been broken down into three distinct component colors. Thus, the effect of seeing the image in simulation of its natural colors is lost and the image must be viewed as a sequence of unnatural changing colors rather than in its component color integrated form.

Again, the undesirable effect of color flicker is avoided by the use of the simultaneous system, since, under the sequential system, flicker is much more pronounced on the eye of the observer. One simultaneous type of color television transmitter is shown, for instance, in the article "Electronic Industries" for December 1946, page 58 et seq., in addition to that of my Patent No. 2,513,159 referred to hereinbefore.

My invention provides receiving apparatus for reproducing color television transmissions of the simultaneous type and, accordingly, it is one of the objects of my invention to provide a color television receiver which is particularly useful in such a transmission system.

In my Patent No. 2,513,159, which has been referred to hereinbefore, the light rays representative of an optical image to be televised are directed along a path to a partially transparent reflecting member or dichroic mirror and one set of rays is arranged to pass through the reflecting member and another will be reflected therefrom. The image representation reflected from the partially transparent reflecting member is directed through an appropriate color filter and thence to a camera apparatus which develops under controlled scanning operations output signal representations of the component color which is allowed to pass through to the camera by this first color filter.

The optical image representation which passes through the partially transparent reflecting member is then directed to a second partially transparent reflecting member where one image representation will pass through and another will be reflected therefrom. The reflected image may be directed through a second color filter onto a camera apparatus which develops signal representations of the second of the additive component colors of the image being televised and the image representation which passes through the second partially transparent reflecting member is directed through a third color filter to a third camera apparatus which develops signal representations of the third of the additive component colors of the image.

A fundamental frequency is generated and the signal representation of the first of the component colors, for instance, modulates the fundamental frequency directly. With each of the second and third component color signal developing means, there is provided a subcarrier generator and the frequencies of the generated subcarriers are spaced apart one from the other by a selected appropriate amount. Each of these subcarrier frequencies is, in turn, modulated by the signal representations developed by one of the cameras and, after appropriate filtering, used to modulate the fundamental frequency also simultaneously with the direct modulation thereof by the signal representations of the first of the component colors. The modulated fundamental frequency is passed through appropriate filtering apparatus to suppress some of the frequencies developed during the modulation of the fundamental by the three different sets of signals. The receiving apparatus which is provided in accordance with this invention is particularly useful with the transmitter of my co-pending application and it is another of the objects of my invention to provide receiving apparatus to reproduce the signals transmitted by a transmitter such as that of my Patent No. 2,513,159.

Further objects and advantages will become apparent from a reading of the hereinafter appended specification.

My invention in general contemplates, in the preferred embodiment thereof, the provision of a receiver in which the input received signals are impressed onto a broad band R.-F. (radio frequency) amplifier and thence to a converter. The converter is fed with signals from a local oscillator and the output of the converter is fed to a wide band intermediate frequency (I. F.) amplifier. The accompanying sound signals may be derived from the wide band I.-F. amplifier and the video representations are fed to a linear detector. One part of the output of the linear detector is fed through a low pass filter amplifier and the output of the low pass filter will be the signal representations of the component color whose signal representations were used at the transmitter directly to modulate the fundamental frequency and reference may be had to my Patent No. 2,513,159 hereinbefore mentioned as to the development of this signal and the combining of the synchronizing signals therewith.

A second output of the linear detector is passed through a band pass filter amplifier to a detector and thence to a video amplifier whose output will be the video representations of another of the component colors of the televised image. Similarly, a third output of the linear detector is passed through a band pass filter amplifier and detected and reamplified and the output is the video signal representation of the third additive component color of the televised image. The three video signals representative of the additive component colors of the image are simultaneously used with appropriate reproducing apparatus for reproducing the image in color.

In an alternative form of my invention, the signals representative of the component colors of the image being televised are received and are impressed onto a broad band radio frequency (R.-F.) amplifier. The output of the amplifier is impressed onto a converter which also has furnished thereto signals from a local oscillator and the received signals are heterodyned with the local oscillator and the intermediate frequencies so formed are impressed onto a wide band intermediate freqency (I.-F.) amplifier.

The output of the wide band intermediate frequency amplifier is then impressed onto three intermediate frequency amplifiers each of which is turned to allow the passage therethrough of the signals representing one of the component colors and selection of the proper signal is made by these intermediate frequency circuits.

The signal representative of the green component color is selected by an intermediate frequency amplifier, is then detected and the output of the detector is passed to a video amplifier whose output is impressed onto apparatus for reproducing the green component color of the televised image.

The signals representative of the blue component color are selected by a tuned intermediate frequency amplifier, are detected, and then, after being amplified, are impressed onto an apparatus for reproducing the blue component color of the televised image.

Similarly, the signals representative of the red component color of the image being televised are selected by the third intermediate frequency amplifier and, after detection and further amplification, are impressed onto apparatus for reproducing the red component color of the televised image. The reproducing apparatus is a kinescope with appropriate means associated therewith for developing light of the proper color and representative of the signal which has been impressed thereon. Accordingly, the amplified outputs of the signals representing the component colors may be impressed in each instance onto the grid of the kinescope which is used for reproducing the particular component color which that signal represents, and all of the reproducers together reproduce the image in a color which simulates its natural color.

My invention will best be understood by referring to the drawings in which.

Figure 4:
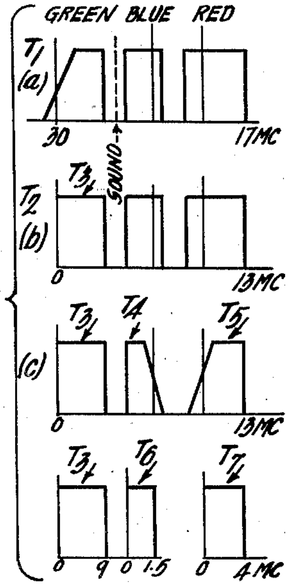
Figure 5:
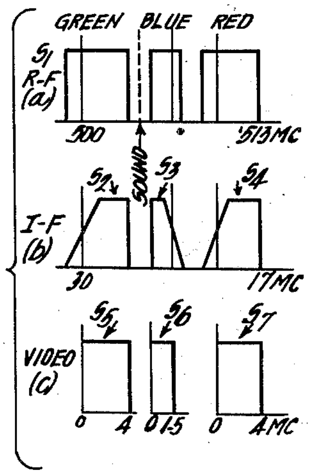

Fig. 4, sections *a* through *d* thereof, are explanatory curves; and,

Fig. 5, sections *a* through *c* thereof, are explanatory curves.

Figure 1:
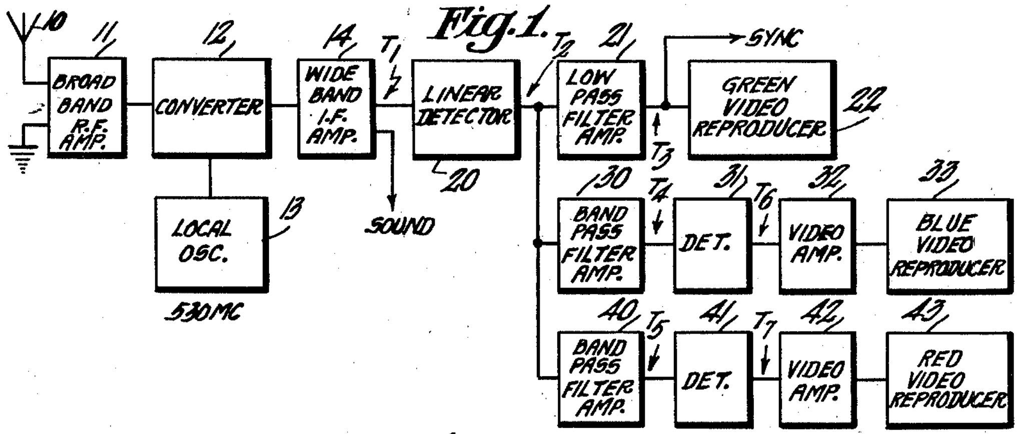
Fig. 1 is a schematic block diagram representation of one embodiment of my invention.

Referring to Fig. 1, there is shown a schematic block diagram of a color television receiver in accordance with my invention and which is particularly adaptable for use with the simultaneous color transmission system set forth in my Patent No. 2,513,159 hereinbefore referred to. In the arrangement of this figure, signals are received by an antenna 10 and are fed to a broad band radio frequency amplifier 11. The amplified signals so formed are fed to a converter stage 12, and also feeding into the converter stage is the output of a local oscillator 13. For purposes of illustration only, it has been indicated that the local oscillator frequency is 530 mc.

The output signals from the converter stage 12 are in the form of an intermediate frequency and are impressed onto the input of a wide band intermediate frequency amplifier 14. The output of this amplifier will contain signal representations of the three additive component colors, and synchronizing signals, and sound signals.

The sound signals are fed to a frequency modulated receiver (not shown) where they are utilized. Such receivers are well known per se and since they do not comprise the essence of this invention, will not be illustrated in detail. The sound portion may be of the general type now in commercial use in the United States in conjunction with black and white monochrome television reception.

The signals, other than the sound signals, are fed to a linear detector 20. Included in the output of the linear detector will be, first, signals representative of the image in its green component color and accompanied by suitable synchronizing signals; second, signals which will comprise a first subcarrier modulated by signals representative of the image in its blue component color; and, third, signals which will comprise a separate and second sub-carrier modulated in accordance with the values of the image in its red component color.

The first group of signals is fed to a low pass filter amplifier circuit 21 to provide amplified output signals representing the green video signal component color and the synchronizing signals. These signals may be separated one from the other by well known signal separation means such, for instance, as shown by the various clipper circuits described in "Television Simplified" by Kiver, published by D. Van Nostrand Co. 1946, at page 196 et seq. The separated video signal representing the green component color of the image is then impressed upon the image reproducing means 22 for reconstructing the green component color of the televised image.

The second group of signals comprising one of the sub-carriers modulated by the signal representations of the image being televised in its blue component color is impressed upon a band pass filter amplifier 30 whose output is detected by detector 31 and the detected signals, which comprise the blue component color video signals, are passed to a video amplifier 32 and thence to suitable apparatus (such as a cathode ray tube or kinescope) for reproducing the blue component color fields of the image being televised.

The third group of output signals from the linear detector 20 and which will comprise the second subcarrier frequency modulated by the red component color signal representations of the televised image are impressed upon a band pass filter and amplifier 40. The amplified signals are detected by detector 41. These signals are amplified by video amplifier 42 and are utilized to control the image reproducing apparatus, such as a cathode ray tube or kinescope, for reproducing the red component color of the image being televised.

For purposes of clarity, the wave formations appearing in different sections of the receiver have been indicated by letters and these will be shown more clearly hereinafter with reference to Fig. 4.

Figure 2:
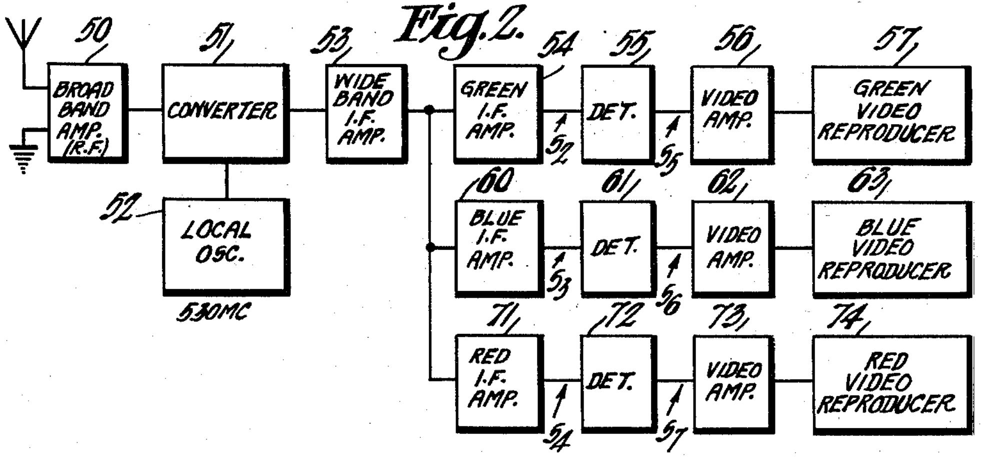
Fig. 2 is a schematic block diagram representation of an alternative form of my invention.

Referring to Fig. 2, there is shown a block diagram representation of an alternative form of receiver which may be used to receive color television signals where they are transmitted on three separate carrier waves or are transmitted by the modulation of one carrier wave directly with one color component and two subcarriers modulated by the other two component color signal representations. In the arrangement of this figure, the received signals are impressed onto a broad band radio frequency amplifier 50 and are passed to a converter unit 51. A local oscillator 52 supplies oscillations to the converter to convert the incoming signals to an intermediate frequency range and the differing frequencies so formed are passed to a wide band intermediate frequency amplifier 53.

One output from amplifier 53 is impressed onto a second intermediate frequency amplifier 54 and the output thereof is detected by detector 55 and, after amplification by video amplifier 56, is impressed onto the reproducer 57, which, in this illustration, is represented as the green video reproducer.

Selection of the green signal representations may be accomplished by properly choosing the tuning of the intermediate frequency amplifier 54. Whether the three separate carrier system of transmission is used or the subcarrier system of transmission is used, it will be appreciated that the green I.-F. amplifier may be tuned to a frequency which is a difference frequency between the fundamental carrier which is modulated by the green signal and the assumed 530 mc. frequency supplied by the local oscillator.

Similarly, the blue component color video signals may be derived by impressing an output of the wide band amplifier 53 onto the input of an intermediate frequency amplifier 60 which, in this case, is represented as a blue intermediate frequency amplifier. In other words, this amplifier is tuned to the frequency which is the difference frequency between the fundamental carrier which is modulated by the blue video signals in the three individual carrier system of signal transmission and the 530 mc. supplied by the local oscillator 52. Where the subcarrier system of transmission is used, the I.-F. tuning of the element 60 will be the difference between the assumed 530 mc. of the local oscillator and the frequency band formed by the modulation of the fundamental frequency at the transmitter by a subcarrier which has, in turn, been modulated by the signals representative of the blue component color of the image being televised.

The output of the I.-F. amplifier 60 is detected by detector 61 and, after amplification by video amplifier 62, is also impressed upon a suitable image reproducing apparatus 63 for recreating the blue color component image of the televised image.

A third output of the I.-F. amplifier 53 may be selected by proper tuning of a third I.-F. amplifier 71. The output of the red component color signal I.-F. amplifier is detected by detector 72 and the output thereof will be signal representations of the red component color of the image being televised. After detection, the resultant signals are impressed upon a video amplifier 73 whose output is fed to a suitable image reproducing apparatus 74 for recreating the red component color of the image being televised.

Figure 3:
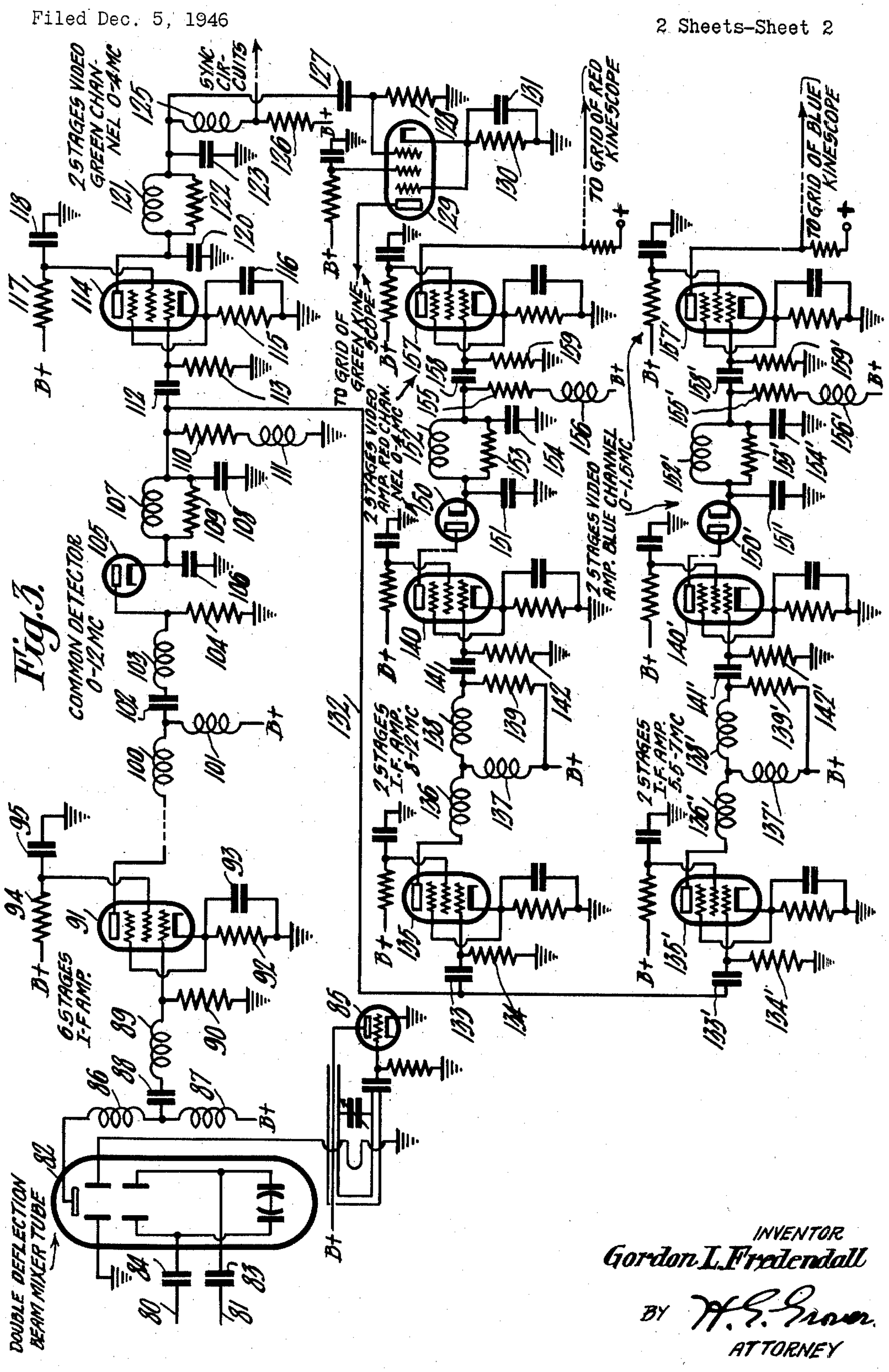
Fig. 3 is an illustrative circuit diagram of the block diagram representation of Fig. 1.

Referring to Fig. 3, there is shown a schematic circuit diagram of a portion of the apparatus which has been illustrated in block diagram form in Fig. 1. In this figure, the signals received by the antenna 10 are brought in by lines 80 and 81 and impressed onto the input circuit of a double deflection beam mixer tube 82 through appropriate coupling condensers 83 and 84. This tube, in actual practice, is RCA type A-5661.

There is provided a resonant line type of local oscillator embodying, in one form of use, an RCA 955 type tube 85. The output of this oscillator 85 is fed to the input circuit of the beam mixer tube 82. This unit is the 530 mc. oscillator which comprises the element 13 of Fig. 1 and the element 52 of Fig. 2. In Fig. 1, it has further been indicated that a broad band radio frequency amplifier 11 is provided between the antenna 10 and the converter 12. However, in the representation of Fig. 3, the broad band amplifier 11 has been omitted and signals brought in directly from the antenna by a transmission line, although it is to be understood the amplifier may be used where desired.

The output of mixer tube 82 then is passed to a wide band intermediate frequency (I.-F.) amplifying circuit. In one form of system used in actual practice of the invention, this unit comprised six stages of which one illustrative stage has been shown here and the drawing has been marked to indicate that six stages (more or less as desired) are used. The plate of tube 82 is connected serially with inductance 86 and inductance 87 and with the positive side of a plate potential source (not shown) indicated by B+ and connected to the free end of inductance 87. The inductance 86 is also serially connected with capacitor 88, inductance 89 and resistor 90, the latter being grounded at its terminal remote from inructance 89. One grid of a vacuum tube 91 is connected to the common treminal of inductance 89 and registor 90. The cathode of the tube is grounded through resistor 92, the latter having condenser 93 shunted across it. The screen grid of the tube is connected in known manner to a source of positive potential source (not shown) indicated by B+ through resistor 94 and is A. C. grounded through condenser 95. The output of the tube 91 will be impressed onto the next stage (not shown) of I.-F. amplifier and the output of the final stage will be connected serially with inductances 100 and 101 to a source of positive potential indicated by B+.

Inductance 100 also is serially connected with condenser 102, inductance 103 and resistor 104, the latter being grounded at its uncommon terminal. The common terminal of inductance 103 and resistance 104 is connected to the plate of a diode detector 105, and the cathode thereof is A. C. grounded through condenser 106. The cathode of the diode also is connected through inductance 107 and serially connected condenser 108 to ground. Inductance 107 is shunted by resistor 109. In parallel with condenser 108 is a series circuit comprising resistor 110 and inductance 111. Inductance 107 is grounded through serially connected condenser 112 and resistor 113 across which elements the detector output is derived.

A control grid of a vacuum tube 114 is connected to the common terminal of resistor 113. The cathode of this tube is grounded through resistor 115 which has condenser 116 connected in shunt therewith. The screen grid is fed to a source of biasing voltage (not shown), identified by B+ through resistor 117 and is A. C. grounded through condenser 118.

The plate to tube 114 is connected to a network comprising a condenser 120 connected serially between the plate and ground. There is further provided an inductance 121 shunted by resistor 122 and this combination is connected serially with the plate to ground through condenser 123. Also connected serially with inductance 121 is inductance 125 and resistor 126, the latter being connected to a source of positive potential (not shown) identified by B+. In shunt with condenser 123 is a series circuit comprising condenser 127 and resistor 128, the latter being grounded at its uncommon terminal. The signal output from tube 114 is impressed through the coupling condenser 127 onto the control grid to a vacuum tube amplifier 129 having the cathode thereof grounded through resistor 130, the latter being shunted by condenser 131.

The output of the tube 129 is fed to the apparatus (not shown, but such an element as a kinescope, for instance) for reproducing the green component color of the image being televised through the signal control effective upon a control element of such a tube.

Signals from the output circuit of detector 105 are also taken from the common terminal of resistor 110 and condenser 112 and fed by way of conductor 132 to the input of two intermediate frequency amplifying circuits. Since these circuits are similar in use and operation, the connections of only one will be set forth in this specification, but like components have like numbering with a prime added, although it should be noted that this does not signify identical parameters but rather function.

The signals brought in by conductor 132 are fed via coupling condenser 133 and input resistor 134 through a multigrid vacuum tube circuit having tube 135. The output thereof is impressed upon a suitable number of stages of intermediate frequency amplification, such as the indicated two stages, for example. One of these stages is shown to illustrate the principles of operation.

The output is taken from the plate of tube 135 and the plate itself is connected to a source of biasing voltage (not shown) identified by B+ through two serially connected inductances 136 and 137. Connected in shunt with inductance 137 is the series connection of inductance 138 and resistance 139. Signals appearing at the common terminal of this inductance and resistance are applied to a control grid of a multigrid tube 140 by means of coupling condenser 141 and resistance 142.

The output of the last stage of the intermediate frequency amplifier is fed to a diode detector 150 and the cathode of the diode is connected to a network circuit wherein the cathode is A. C. grounded through condenser 151 and one side of the cathode is connected serially with a circuit comprising inductance 152 shunted by resistance 153, and condenser 154 connected in series with the shunted circuit. The uncommon terminal of condenser 154 is grounded. Connected in series with inductance 152 is resistor 155 and serially connected inductance 156, the latter being connected to a source of biasing potential (not shown) which is marked B+.

The signals appearing at the common terminal of elements 154 and 155 are impressed onto a control grid of a thermionic amplifying tube 157 by means of coupling condenser 158 and grounded grid resistor 159. The output of the last amplifying tube of this video amplifying apparatus may be fed to suitable apparatus for reproducing the red component color of the optical image being televised as above described and which may be accomplished, for instance, as shown in this figure by means of the "red" kinescope.

Similarly, the signal output from detector 105 is impressed through coupling condenser 133′ and resistor 134′ onto the input of a vacuum tube 135'. This tube feeds its output into a plurality of intermediate frequency (I.-F.) stages and the signals representative of the blue component color of the image being televised are selected thereby.

The output of tube 140' into which the intermediate frequency stages feed is detected by detector 150' and the detected signal is passed through appropriate video amplifying means and the output of the last tube in the video amplifying means is impressed onto the grid of the kinescope whose purpose is to reproduce the blue component color of the televised image.

Referring to Fig. 4, sections *a* to *d* thereof, there is shown a set of explanatory curves which show the relative band widths and shapes of the bands of signals appearing at various indicated points in Fig. 1. Curve $T_1$ of section *a* shows the output signals from the wide band I.-F. amplifier identified as the element 14 of Fig. 1. Curve $T_2$ of section *b* shows the output signal representations from linear detector 20 of Fig. 1. Curves $T_3$ and $T_4$ and $T_5$ of section *c* show the output video representations from filters 21, 30 and 40 and curve $T_6$ and curve $T_7$ of section *d* show the output signal representations from detectors 31 and 41 respectively of Fig. 1. The points where the various wave forms appear in the operation of the circuit of Fig. 1 have appropriate letter references applied, which letters refer to the four parts of Fig. 4.

Referring to Fig. 5, sections *a* to *c* thereof, there is shown a similar set of explanatory curves particularly applicable to Fig. 2. The curve $S_1$ of section *a* of the curve shows the relative positioning and relative band widths of the signal input to the broad band R.-F. amplifier of Fig. 2 from the antenna. The curves $S_2$, $S_3$ and $S_4$ of section *b* of this figure show the relative band widths and shapes of the output signals from the I.-F. amplifying apparatus comprising elements 54, 60 and 71 of Fig. 2. The curves $S_5$, $S_6$ and $S_7$ of section *c* of this figure show the band widths and relative shapes of the bands of signals comprising the green, blue, and red video representations which are present in the output circuits of detectors 55, 61 and 72.

Having now described the invention, what is claimed and desired to be secured by Letters Patent is the following:

1. In a color television receiver wherein there are received sets of signals representative of the optical values of the component colors of the image being televised and wherein the received signals contain at least one subcarrier frequency which has been modulated by signal representations of at least one of the component colors of the image, a local oscillator, means for combining at least a portion of the output of the local oscillator with the received signals to convert the signals to a different frequency, a first detecting means for detecting the converted signals, selective filter means allowing the passage therethrough of subcarrier frequencies of a predetermined range of frequencies, said selective filter means having a sloping attenuation characteristic at the subcarrier frequency to reduce the signal amplitude at the subcarrier frequency by substantially one half, means for impressing the detected signals onto said filter means, second detecting means, means for impressing the output of the filter means onto the second detecting means, and means for reproducing the output signal from said second detecting means.

2. In a color television receiver wherein there are received sets of signals representative of the optical values of the component colors of the image being televised and wherein said signals comprise a fundamental frequency which has been modulated directly by the signals representative of one of the component colors and by a plurality of subcarrier frequencies each of which has been modulated in accordance with the signals representative of one of the component colors of the image being televised, a local oscillator, means for combining at least a portion of the output of the local oscillator with the received signals to convert the received signals to a differing frequency value, a first detecting means for detecting the converted signals, a low pass filter, at least one band pass filter, said band pass filter having a sloping attenuation characteristic at the subcarrier frequency to reduce the signal amplitude at the subcarrier frequency by substantially one half, means for impressing the output of the first detecting means onto the filters to select the frequency which has modulated the carrier directly and the subcarrier frequencies, means to detect the output of each of said filters, and means to reproduce the output of all of the latter detecting means o recreate the image being televised in a simulation of its natural colors.

3. In a color television receiver wherein there are received sets of signals representative of the optical values of the additive component colors of the image being televised, a local oscillator, means for combining at least a portion of the output of the local oscillator with the received signals to convert the received signals to frequencies of a differing value, a first intermediate frequency selective means for selecting signals representative of the green component color of the televised image, means for detecting the output of the first selective means, a second intermediate frequency selective means for selecting signals representative of the optical values of the red component color of the televised image, said second intermediate frequency selective means having a linear sloping attenuation characteristic about its selected subcarrier frequency reducing the signal at its selected subcarrier frequency to substantially half amplitude means for detecting the output of the second selective means, a third intermediate frequency selective means, said third intermediate frequency selective means having a linear sloping attenuation characteristic about its selected subcarrier frequency reducing the signal at its selected subcarrier frequency to substantially half amplitude, means for detecting the output of the third selective means, and means for reproducing the outputs of all of the detecting means to recreate the televised image in a simulation of its natural colors.

4. Apparatus in accordance with claim 3 wherein the local oscillator is a resonant line type of oscillator.

5. Apparatus in accordance with claim 3 wherein the means for combining signals from the local oscillator with the received signals comprises a double deflection type of beam mixer thermionic tube.

6. A color television receiver comprising in combination means for receiving a television signal carrier containing a modulated subcarrier signal representative of a selected component color image, a signal filter connected to said receiving means and passing only said modulated subcarrier signal, said signal filter having a substantially linear sloping attenuation characteristic about said subcarrier frequency reducing the signal at said subcarrier frequency to substantially half amplitude, means connected to said filter for detecting said modulated subcarrier, and image reproducing means connected to said detecting means.

7. A color television receiver comprising in combination means for receiving radio carrier signals containing a plurality of modulated subcarrier signals each representative of a different selected component color image, a plurality of band pass filters connected to said receiving means and each filter passing only one different of said modulated subcarrier signals, said signal filters having a substantially linear sloping attenuation characteristic about its passed subcarrier frequency reducing the signal at its passed subcarrier frequency to substantially half amplitude and separate signal detecting means connected to each of said filters, and separate image reproducing means connected to each of said detecting means.

GORDON L. FREDENDALL.

REFERENCES CITED

The following references are of record in the file of this patent:

UNITED STATES PATENTS

| Number | Name | Date |
|---|---|---|
| 2,300,315 | Puhlmann | Oct. 27, 1942 |
| 2,301,395 | Goldsmith | Nov. 10, 1942 |
| 2,335,180 | Goldsmith | Nov. 23, 1943 |
| 2,375,966 | Valensi | May 15, 1945 |
| 2,413,423 | Wilson | Dec. 31, 1946 |